United States Patent [19]

Byrd et al.

[11] Patent Number: 5,256,335
[45] Date of Patent: Oct. 26, 1993

[54] CONDUCTIVE POLYKETONE POLYMERS

[75] Inventors: Paul S. Byrd, Houston; Richard L. Danforth, Missouri City, both of Tex.

[73] Assignee: Shell Oil Company, Houston, Tex.

[21] Appl. No.: 973,867

[22] Filed: Nov. 9, 1992

[51] Int. Cl.$^5$ .......................... H01B 1/06; C08K 3/04
[52] U.S. Cl. .................... 252/500; 252/511; 524/496
[58] Field of Search ................ 524/496; 252/511, 500

[56] References Cited

U.S. PATENT DOCUMENTS

| 4,857,147 | 8/1989 | Danforth et al. | 162/156 |
| 4,861,428 | 8/1989 | Van Breen et al. | 162/168 |
| 4,935,304 | 6/1990 | Danforth | 428/423.1 |
| 5,063,088 | 11/1991 | Coleman-Kammula et al. | 427/352 |
| 5,068,289 | 11/1991 | George et al. | 525/179 |

Primary Examiner—Paul R. Michl
Assistant Examiner—Tae H. Yoon
Attorney, Agent, or Firm—James O. Okorafor

[57] ABSTRACT

Conductive polymer compositions comprising a linear alternating polyketone polymer and a conductive carbon fiber exhibit conductive properties at low additive loadings.

20 Claims, No Drawings

CONDUCTIVE POLYKETONE POLYMERS

FIELD OF THE INVENTION

This invention relates to polyketone polymers, and, more particularly, to a conductive polymer blend composition comprising a major portion of a polyketone polymer and lesser portions of a conductive additive.

BACKGROUND OF THE INVENTION

Polyketone polymers are relatively high molecular weight materials having established utility as premium thermoplastics in the production of shaped articles, such as containers for food and beverages and parts for the automotive industry, which are produced by processing the polyketone polymer according to well known methods. For some particular applications it is desirable to have properties which are somewhat different from those of the polyketone polymers. The more desirable properties of the polyketone polymers may be retained, and yet other properties improved, through the provision of a conductive polymer compound.

Polymers are combined with conductive additives to form polymer blends that are capable of conducting electrical current and useful for a variety of applications. Conductive polymer blends provide shielding from electromagnetic or radio frequency interference and facilitate electrostatic discharge. Typical shielding applications include housings for computers portable electronic instruments, or military communications equipment. Bearings, bushings, rollers, gears, fuel transfer lines, and connectors are good applications for conductive polymer blends, particularly when electrostatic discharge (e.g. to prevent electric shock or sparks) is a desired property. Conductive polymer blends are also used for molded parts that will be painted electrostatically. Occasionally, conductive polymer blends are used to conduct electronic signals, such as in computer keyboards and EKG electrodes. Conductive additives are often selected for specific applications based on both the electrical and mechanical properties of the resulting conductive blends.

It is an object of this invention to provide a conductive polymer blend, containing a low concentration of a conductive additive, that exhibits low resistivity. The conductive polyketone blends of the subject invention exhibit surface and volume resistivities that are unexpectedly lower than the levels typical for other polymers blended with comparable amounts of such conductive additives.

SUMMARY OF THE INVENTION

The present invention provides conductive polymer blends of a linear alternating polymer of carbon monoxide and at least one ethylenically unsaturated hydrocarbon, blended with a conductive additive. The amount of conductive additive present in the conductive blends may be from about 5 wt % to about 20 wt %, based on total blend composition. The preferred conductive additive is carbon fiber. The carbon fibers are present at from about 5 wt % to about 20 wt %, and preferably from about 7 wt % to about 15 wt %, based on total blend composition. The conductive blends demonstrate unusually low surface and volume resistivities combined with suitable mechanical properties. In particular, the blends exhibit surface resistivities of less than about 700 ohms/square and volume resistivities of less than about 400 ohm-centimeter. The invention also includes articles of manufacture prepared from, and coated with, such conductive blends.

DESCRIPTION OF THE INVENTION

The polyketone polymers which are employed as the major component of the conductive polymer blends of the invention are of a linear alternating structure and contain substantially one molecule of carbon monoxide for each molecule of hydrocarbon. Ethylenically unsaturated hydrocarbons suitable for use as monomers in the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene.

The preferred polyketone polymers are copolymers of carbon monoxide and ethylene or terpolymers of carbon monoxide, ethylene, and a second ethylenically unsaturated hydrocarbon of at least 3 carbon atoms particularly an α-olefin such as propylene. When the preferred polyketone terpolymers are employed as the major polymeric component of the blends of the invention, there will be within the terpolymer at least about 2 units derived from a monomer of ethylene for each unit derived from a monomer of the second hydrocarbon. Preferably, there will be from about 10 units to about 100 units derived from a monomer of ethylene for each unit derived from a monomer of the second hydrocarbon.

The polymer chain of the preferred polyketone polymers has recurring units represented by the repeating formula

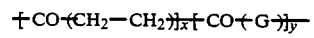

wherein G is derived from the monomer of ethylenically unsaturated hydrocarbon of at least 3 carbon atoms polymerized through the ethylenic unsaturation and the ratio of x:y is at least about 2:1. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(CH$_2$—CH$_2$)—units and the —CO—(G)—units are found randomly throughout the polymer chain, and preferred ratios of x:y are from about 10:1 to about 100:1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

The properties of the polyketone polymer are greatly influenced by the molecular purity of the polymer, as measured by the extent to which the polymer consists of repeating units of the above formula. A polymer of substantially lower carbon monoxide content cannot exhibit the linear alternating nature of the above formula. A polymer made by other methods, such as by free radical polymerization, will not typically have the regular, linear alternating structure of the polyketone polymers used in this invention.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat. No. 4,880,903 (Van Broekhoven et al.), incorporated herein by reference, discloses a linear alternating polyketone polymer of carbon monoxide, ethylene, and other olefinically unsaturated hydrocarbons, such as propylene. Processes for production of such polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (Van Broekhoven et al.), incorporated herein by reference, discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The second component of the conductive polymer blends of the invention is a conductive additive. Commercially available conductive additives include carbon black powder, carbon fibers, iron powder, stainless steel powder and fibers, copper powder, bronze powder, brass fibers and powder, aluminum fibers and flakes, nickel powder and flake, lead powder, and zinc powder. Some conductive additives may be coated with other conductive materials, such as nickel-coated carbon fibers. The cost of the additive must be considered, along with the properties it will provide, for any commercial application.

The conductive additive of the invention is conductive carbon fiber, a commercially available material produced by known methods. Polyacrylonitrile (PAN), pitch, and rayon are all used as precursors in the production of carbon fiber. PAN is the preferred precursor for the conductive carbon fibers of the invention. Carbon fibers are available in chopped, milled, and continuous fiber forms. Chopped fibers are preferred in the invention. Chopped fibers typically have a high aspect ratio, with a fiber length of from about 5 mm to about 10 mm and a fiber diameter of from about 5 $\mu$m to about 10 $\mu$m. The carbon fibers of the invention are preferably obtained from the manufacturer with a surface treatment compatible with the polyketone polymer, such as a polyurethane sizing.

Polymers blended with conductive additives may be categorized, based on their surface resistance, as antistatic, static dissipative, and conductive. A polymer blend may be considered antistatic if it exhibits a surface resistivity in the range of about $10^{12}$ to about $10^{14}$ ohms/square, static dissipative if it exhibits a surface resistivity in the range of from $10^5$ to about $10^{11}$ ohms/square, and conductive if it exhibits a surface resistivity of about $10^0$ to about $10^5$ ohms/square.

The conductive polymer blends of the invention have been found t exhibit conductivity at significantly lower loadings of conductive additive than those for comparable polymers. The polyketone polymers exhibit surface resistivity in the conductive range at very low loadings of carbon fiber. In particular, polyketone blends containing from about 5 wt % to about 20 wt % carbon fiber, and more preferably from about 7 wt % to about 15 wt % carbon fiber, exhibit a surface resistivity of less than about 700 ohms/square and a volume resistivity of less than about 400 ohm-centimeter. Most preferably, polyketone blends containing from about 10 wt % to about 15 wt % exhibit a surface resistivity of less than about 150 ohms/square and a volume resistivity of less than about 50 ohm-centimeter. As conductive blends are defined to be those exhibiting a surface conductivity of less than $10^5$ ohms/square, the blends of the invention are clearly conductive.

To compound conductive polymer blends, enough conductive additive must be added to form a continuous conductive network within the polymer. Long, thin fibers with a high aspect ratio are preferred. The method of producing the conductive polymer blends of the invention is not material so long as a relatively uniform distribution of the conductive additive throughout the polyketone is obtained, and the conductive additive maintains its physical integrity (e.g. fibers sustain minimal breakage). A preferred method is to incorporate the conductive additive into the polymer after the polymer has been heated to a molten state. This is usually accomplished during polymer extrusion by introducing the conductive additive into a low-shear section of the extruder via a down-stream feeder.

The conductive polymer blends of the invention may also include other additives such as antioxidants and stabilizers, dyes, fillers or reinforcing agents, fire resistant materials, mold release agents, colorants and other materials designed to improve the processability of the polymers or the properties of the resulting compound. Such additives are added prior to, together with, or subsequent to the blending of the polyketone and carbon fiber. The presence of these additives may affect the optimum level of carbon fiber for a given application.

The blends are processed by methods such as extrusion and injection molding into sheets, films, plates and shaped parts. Illustrative applications include articles useful in machines and electronic components, and in both internal and external parts for automotive use.

The invention is further illustrated by the following Examples which should not be regarded as limiting.

EXAMPLE 1

A linear alternating terpolymer of carbon monoxide, ethylene, and propylene (90/075) was produced in the presence of a catalyst composition formed from palladium acetate, trifluoroacetic acid and 1,3-bis[di(2-methoxyphenyl)phosphino]-propane. The polyketone polymer had a melting point of about 220° C. and an LVN of about 1.1 dl/g when measured in m-cresol at 60° C. The polyketone polymer also contained conventional additives.

EXAMPLE 2

Conductive polymer blends were prepared by combining the polymer of Example 1 with a chopped carbon fiber obtained from BASF. The carbon fiber was produced from polyacrylonitrile, and had a sizing compatible with polyketone polymer. The fibers had a length of about 6 mm and a diameter of about 7 μm.

Blends were prepared to contain 7 wt %, 10 wt %, and 15 wt % carbon fiber, based on total blend composition.

All of the blends were prepared by melt compounding the polyketone polymer, with or without carbon fiber, on a Berstorff intermeshing corotating twin screw extruder, at melt temperature of from about 235° C. to about 250° C. Samples of each blend were injection molded into ASTM test specimens using a Toshiba 90 ton injection molding machine. Tests were conducted on the specimens to determine mechanical and electrical properties in accordance with ASTM standards. Results are shown in Table 1.

The results indicate that tensile strength, flexural strength, and flexural modulus all increased and became more rigid with increased carbon fiber content. However, the addition of carbon fiber reduced the notched Izod impact strength. Addition of small amounts of carbon fiber also significantly reduced linear mold shrinkage. In general, the blends exhibit a useful balance of mechanical properties.

As expected, electrical conductivity increased with increased carbon fiber content. Surprisingly, the surface resistivities (measured in ohms/square) and volume resistivities (measured in ohm-centimeters) exhibited were extremely low, even with only 7 wt % carbon fiber. Comparable engineering thermoplastic polymers typically exhibit much greater resistivities at comparable filler levels, as shown in Table 2.

The low resistivities demonstrated by the polyketone polymer samples containing carbon fiber are considered unexpected. The results indicate that a polyketone polymer, blended with about 7 wt % to 15 wt % carbon fiber, forms a very conductive polymer compound, with a surface resistivity of 650 ohms/square or less.

TABLE 1

| Physical Properties | Polyketone (Control) | Polyketone with Carbon Fiber | | |
|---|---|---|---|---|
| | | 7 wt % | 10 wt % | 15 wt % |
| Tensile Strength (psi) | 9,900 | 12,350 | 14,730 | 17,910 |
| Tensile Elongation (%) | 59 | 4 | 3.6 | 3.4 |
| Flexural Strength (psi) | 10,100 | 18,400 | 21,760 | 25,410 |
| Flexural Modulus (psi) | 254,600 | 736,350 | 963,000 | 1,273,000 |
| Izod Impact Strength (⅛″ specimen) (ft-lbs/in) | 1.9 | 1.2 | 1.23 | 1.51 |
| Izod Impact Strength (¼″ specimen) (ft-lbs/in) | 1.7 | 0.97 | 1.05 | 1.29 |
| Unnotched Impact Strength (ft-lbs/in) | 40.8 | 7.17 | 7.69 | 9.07 |
| Deflection Temperature Under Load @ 264 psi (°F.) | 235 | 417 | 419 | 419 |
| Linear Mold Shrinkage | | | | |
| ⅛″ specimen (in/in) | 0.0229 | 0.0025 | 0.0016 | 0.0011 |
| ¼″ specimen (in/in) | 0.0301 | 0.0040 | 0.0029 | 0.0028 |
| Surface Resistivity (Ω/sq) | >2.0 × $10^{16}$ | 650 | 134 | 40 |
| Volume Resistivity (Ω-cm) | 4.6 × $10^{14}$ | 339 | 22.5 | 3.2 |

TABLE 2

| Physical Properties | Thermoplastics with 10 wt % Carbon Fibers | | | |
|---|---|---|---|---|
| | Polyketone | Nylon-6,6 | Polycarbonate | Polyacetal |
| Tensile Strength (psi) | 14,730 | 20,000 | 15,000 | 12,000 |
| Tensile Elongation (%) | 3.6 | 4 | 3 | 1.3 |
| Flexural Strength (psi) | 21,760 | 30,000 | 24,000 | 14,000 |
| Flexural Modulus (psi) | 963,000 | 1,000,000 | 1,100,000 | 1,000,000 |
| Izod Impact Strength (⅛″ specimen) (ft-lbs/in) | 1.23 | 0.8 | 1.7 | 0.7 |
| Deflection Temperature Under Load @ 264 psi (°F.) | 419 | 480 | 288 | 320 |
| Surface Resistivity (Ω/sq) | 134 | $10^4$–$10^5$ | $10^5$–$10^6$ | $10^3$–$10^4$ |
| Volume Resistivity (Ω-cm) | 22.5 | $10^2$–$10^3$ | $10^3$–$10^4$ | 10–100 |

Other embodiments of the invention will be apparent to those skilled in the art from a consideration of this specification, or by practice of the invention described herein. It is intended that the specification and examples be considered as exemplary only, with the true scope and spirit of the invention being indicated by the following claims.

What is claimed is:

1. A conductive polymer blend composition, exhibiting a surface resistivity of less than about 700 ohms/square, comprising a linear alternating polyketone polymer and from about 5 wt % to about 20 wt % of a conductive carbon fiber, based on total blend composition.

2. The composition of claim 1 wherein the polyketone polymer is represented by repeating units of the formula

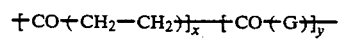

wherein G is derived from the monomer of ethylenically unsaturated hydrocarbon of at least 3 carbon atoms polymerized through the ethylenic unsaturation and the ratio of x:y is at least about 2:1.

3. The composition of claim 2 wherein the carbon fiber is present in an amount from about 7 wt % to about 15 wt %, based on total blend composition.

4. The composition of claim 3 wherein y is 0.

5. The composition of claim 3 wherein the ratio of x:y is from 10:1 to about 100:1.

6. The composition of claim 5 wherein G is derived from a monomer of propylene.

7. The composition of claim 6 wherein the surface resistivity is less than about 150 ohms/square, and the carbon fiber is present in an amount from about 10 wt % to about 15 wt %, based on total blend composition.

8. A conductive polymer blend composition, exhibiting a volume resistivity of less than about 400 ohm-centimeter, comprising a linear alternating polyketone polymer filled with from about 5 wt % to about 20 wt %, based on total blend composition, of a conductive carbon fiber.

9. The composition of claim 8 wherein the polyketone polymer is represented by repeating units

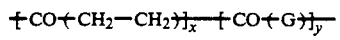

wherein G is derived from the monomer of ethylenically unsaturated hydrocarbon of at least 3 carbon atoms polymerized through the ethylenic unsaturation and the ratio of x:y is at least about 2:1.

10. The composition of claim 9 wherein the carbon fiber is present in an amount from about 7 wt % to about 15 wt %, based on total blend composition.

11. The composition of claim 10 wherein y is 0.

12. The composition of claim 10 wherein the ratio of x:y is from 10:1 to about 100:1.

13. The composition of claim 12 wherein G is a monomer of propylene.

14. The composition of claim 12 wherein the volume resistivity is less than about 50 ohm-centimeter, and the carbon fiber is present in an amount from about 10 wt % to about 15 wt %, based on total blend composition.

15. An article manufactured from the composition of claim 2.

16. An article coated with the composition of claim 2.

17. A conductive polymer blend composition which exhibits a surface resistivity of less than about 700 ohms/square, consisting essentially of a linear alternating polyketone polymer, wherein the polyketone polymer is represented by repeating units of the formula

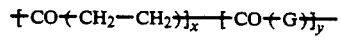

and wherein G is derived from the monomer of ethylenically unsaturated hydrocarbon of at least 3 carbon atoms polymerized through the ethylenic unsaturation and the ratio of x:y is at least about 2:1; and from about 5 wt % to about 20 wt % of a conductive carbon fiber, based on total blend composition.

18. The composition of claim 17 wherein y is 0.

19. The composition of claim 17 wherein the ratio of x:y is from 10:1 to about 100:1.

20. The composition of claim 19 wherein G is a monomer of propylene.

* * * * *